United States Patent [19]

Bauer

[11] 3,711,054
[45] Jan. 16, 1973

[54] CONTINUOUSLY ADJUSTABLE LIFTING DEVICES

[76] Inventor: Fritz Bauer, 14 Schulzstrasse, D-8503 Altdorf near Nuremberg, Germany

[22] Filed: June 19, 1970

[21] Appl. No.: 47,846

Related U.S. Application Data

[63] Continuation-in-part of Ser. No. 881,436, Dec. 2, 1969, Pat. No. 3,656,593.

[30] Foreign Application Priority Data

June 19, 1969 Germany.....................P 19 31 012.4

[52] U.S. Cl. ...................248/400, 248/161, 297/345
[51] Int. Cl. ........................A47b 95/00, A61g 15/00
[58] Field of Search...........248/157, 161, 404, 188.2; 108/144; 297/199, 345, 347; 254/93 R

[56] References Cited

UNITED STATES PATENTS

| | | | |
|---|---|---|---|
| 2,446,127 | 7/1948 | Cramer | 248/400 X |
| 3,004,743 | 10/1961 | Wenger | 248/161 |
| 3,547,394 | 12/1970 | Wehner | 297/345 X |
| 3,339,873 | 9/1967 | Hale | 248/404 |

FOREIGN PATENTS OR APPLICATIONS

| | | | |
|---|---|---|---|
| 1,365,427 | 5/1964 | France | 248/404 |

*Primary Examiner*—J. Franklin Foss
*Attorney*—Misegades and Douglas

[57] ABSTRACT

A device for the stepless height adjustment of the seat surface member of a chair, stool or the like using a fluid spring member with a tubular housing which simultaneously serves as a part of the supporting column of the chair, stool or the like, the piston rod of the fluid spring member extending downwardly and being mounted with lateral play at its lower end in the base of a guide tube forming another part of the said column.

6 Claims, 3 Drawing Figures

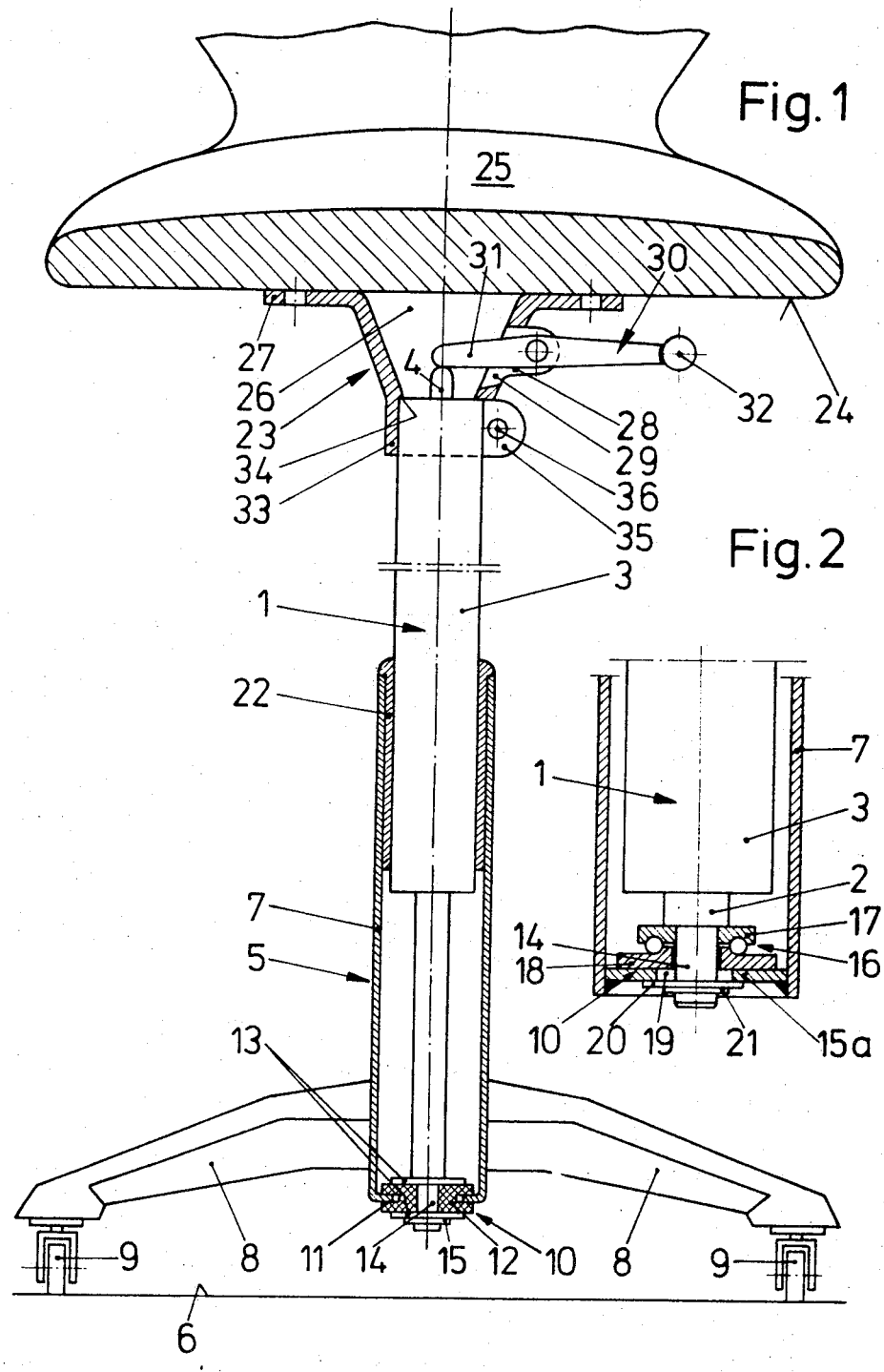

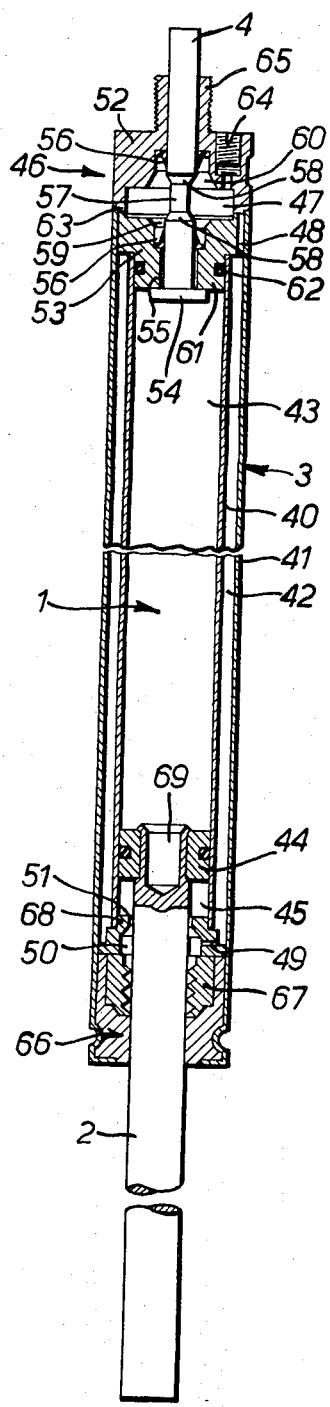
FIG° 3

CONTINUOUSLY ADJUSTABLE LIFTING DEVICES

This application is a co-pending and continuation-in-part application of application Ser. No. 881,436, filed Dec. 2, 1969, now U.S. Pat. No. 3,656,593. (Application indicated allowable Oct. 12, 1971, in Group 315.) This application is incorporated by reference in accordance with the Notice in the Official Gazette of Jan. 27, 1970. Accordingly, claim is made for the benefit of the earlier application Ser. No. 881,436 in the United States under 35 U.S.C. S120.

BACKGROUND OF THE INVENTION

The invention relates to a device for the stepless height adjustment of the seat surface member of a chair, stool or the like. More particularly, the invention relates to such a device, comprising a fluid spring having a tubular housing containing a gas or liquid filling and a piston movable therein, means being provided for fixing the housing to the seat surface member by one end, the piston having a piston rod extending out of the other end of the housing through sealing means, blocking means being provided in a piston by-pass passage for locking the piston in a desired set position by blocking communication between a space below the piston and a space above the piston, the said one end of the housing carrying a release pin for actuating the blocking means.

A lifting device which can be adjusted to desired heights and fixed in position, as previously proposed, has the advantage of being smooth surfaced on its exterior so that it can be conveniently and readily built into an article with which it is to be used, for example the base of a chair. Its overall structural length only insignificantly exceeds the length of the displacement path of its piston rod, this being very desirable.

With compressed filling of the housing, the addition of only a small amount of oil as a lubricant is required, since when the lifting device is in its built-in position, the piston rod always extends downwardly in the direction towards the floor, so that the lubricant always remains in the lower part of the housing, under the action of gravity. Thus, a satisfactory lubrication of the piston and piston rod is ensured and a long life duration of the lifting device is enabled. The individual components have simple shapes which are favorable for subsequent treatments, for example hardening, that is to say they do not distort, or a small degree of distortion has no effect.

SUMMARY OF THE INVENTION

It is an object of the present invention to provide a lifting device for the stepless height adjustment of the seat surface member of a chair, stool or the like, making use of the previously proposed device discussed above, in such a way, that with little expense as regards materials, good stability is given for the stepless height adjustment.

The invention consists in a lifting device for the stepless height adjustment of the seat surface member of a chair, stool or the like, comprising a fluid spring having a tubular housing containing a gas or liquid filling and a piston axially movable therein, means being provided for fixing the housing to the seat surface member by one end, the piston having a piston rod extending out of the other end of the other end of the housing through sealing means, blocking means being provided in a piston by-pass passage for locking the piston in a desired set position by blocking means, the housing being mounted in a vertically extending guide tube forming part a base of the chair, stool or the like, so as to be axially displaceable therein, the free end of the piston rod being laterally movably but axially fixedly mounted in the base of the guide tube, the said fixing means carrying means for receiving an actuating device for the release pin.

Advantageously, the base of the chair, stool or the like comprises supporting arms which are welded onto the lower end of the guide tube. Preferably, a bush, for example of plastics, is provided between the guide tube and the tubular housing, for slidably guiding the tubular housing. The free end of the piston rod may be constructed as a stud for receiving a thrust bearing, the stud extending through the base of the guide tube with radial play and being held captive, substantially without axial play, by a washer and a snap ring, at the lower side of the base of the guide tube, the upper side of the base of the guide tube serving for supporting the thrust bearing.

For connecting the tubular housing and the seat surface member, advantageously a hollow hub member of truncated conical shape is provided which can be fixed to the underside of the seat surface member by means of an annular flange, the lower end of the hub member being provided with a clamping device for enabling clamping of the upper end region of the tubular housing. A two-armed actuating lever may be rockably mounted in the conically extending wall of the hub, one of its arms co-operating with the free end of the release pin, and the other arm being adapted to serve as a handle.

By the construction according to the invention, the pneumatic spring remains structurally unchanged and accordingly, a generally commercially available pneumatic spring may be readily used. The housing of such a pneumatic spring would normally be of steel tube and since the steel tube projects upwardly from the guide tube of the base of the chair, stool or the like, an extremely reliable construction which is resistant to bending is obtained, which is able to withstand high tilting pressures without the danger that bending and consequent permanent deformation could occur. By the rotatable fixing of the free end of the piston rod, premature wear of the sealing rings and the sleeve surface of the working piston is avoided, since the pneumatic spring participates in the rotation on swivelling of the chair, stool or the like, so that relative movement does not occur between the inner sleeve surface of the tubular housing, and the sleeve surface of the working piston. More particularly, owing to the radial play of the fixing end of the piston rod in the base of the guide tube, the pneumatic spring can always align itself in dependence on the changing load direction of the seat surface member, so that it is not subjected to forces which would lead to jamming. This advantageous feature is contributed to by the fixed connection between the tubular housing and the truncated conical mounting hub at the underside of the seat surface member.

A further advantage of the lifting device of the invention is given by the use of gas filling, since when the by-pass passage is closed for locking the piston at a predetermined adjusted height of the seat surface member, the pneumatic spring allows a small but desirable resilient path of movement of the seat surface member downwardly, if the seat surface member is more or less suddenly or jerkingly loaded, so that separate mounting of the lifting device or of the pneumatic spring, for example by use of a compression spring, is not necessary.

It is known to use pneumatic springs with their piston rods extending downwardly, in lifting devices, in order to enable a length adjustment of the overall construction. The known arrangement however, uses two telescopically interengaging rods and a separate releasable connection acting between the pneumatic spring and the hollow rods. The releasable connection is formed by a conical barrier the cone part of which closes off the downwardly directed end of the pneumatic spring. This conical part also serves for guiding the piston rod and for holding a brake cylinder. Between the conical part and the internal surface of the inner hollow rod, rolling components for example balls are arranged which serve for clamping the inner hollow rod, which is slotted at its lower end, to the outer hollow rod. The outer hollow rod constitutes a rigid guide tube fixedly disposed in a frame, base or the like, and has a base which is fixedly connected with the free end of the piston rod.

This known lifting device requires however a second hollow rod which is connected by the upper end, through suitable means, with the lower side of the article to be displaced in height. Moreover, the end of the pneumatic spring facing the floor has to be specially formed and fitted with a conical part, the rolling barrier parts thus constituting additional structural components. The connecting means which connect the inner hollow rod rigidly to the underside of the article to be adjusted in height are connected with the housing of the pneumatic spring, through an actuating device. Once end of an unequal limbed lever arm engaged in an annular groove of the housing of the pneumatic spring, in order to be able to move this for releasing the conical barrier. The known lifting device, compared with the subject of the present invention, thus not only requires a larger and more expensive construction, but requires a pneumatic spring which is specially adapted for use, by the provision of the conical part for the conical barrier, and the annular groove for the actuating device. Contrary to this, the pneumatic spring in the device of the present invention does not require any modification or special preparation. The pneumatic spring can thus be a conventional commercial type, thus ensuring more economic manufacture of the device of the invention.

British Pat. specification No. 915,175 discloses a lifting device for the height adjustment of chair seats, in which the pneumatic spring forms the chair column. Also in the case of this known device, a release pin extending out of the upper end of the pneumatic spring is proviced, the free end of which co-operates with an unequal limbed lever of an actuating device which is mounted in means fixed on the underside of the chair seat. The pneumatic spring is fixed to the base of a guide tube to which supporting arms are welded so as to form the base of the chair.

In this known arrangement, the piston rod extends out of the upper end of the housing and is of hollow construction. The release pin passes through the entire length of the piston rod in order that it can be actuated by the actuating device of the underside of the seat surface, from outside the working piston. Apart from the fact that such a construction of the pneumatic spring is expensive, the chair column is formed solely by the hollow piston rod. The piston rod is of considerably smaller diameter than the housing and with a normal construction of the pneumatic spring is not suited to withstand high loads, for example heavy people, or to withstand the tilting forces exerted by them, without deforming. A suitably stronger construction of the piston rod is however not possible, as the housing diameter would then require to be so great that the pneumatic spring could no longer be used for chair construction, owing to its large dimensions.

In the device of the invention, the housing, which is essentially larger in diameter than the piston rod, forms the chair column. In this respect, the pneumatic spring is considerably more economic since the release pin can be of short construction and the piston rod can be solid and can be guided out of the housing from the lower end thereof.

BRIEF DESCRIPTION OF THE DRAWINGS

There follows a detailed description and accompanying drawings which illustrate and describe a preferred embodiment of the invention:

FIG. 1 is a vertical sectional view through a lifting device of the invention, for the height adjustment of the seat surface member of a chair;

FIG. 2 is a vertical sectional view, to a larger scale than FIG. 1, of the region of connection between a piston rod of the device, and a guide tube; and FIG. 3 is a vertical and longitudinal sectional view through a lifting device of a preferred embodiment of the invention.

DETAILED DESCRIPTION OF THE PREFERRED EMBODIMENT

In the embodiment illustrated, a pneumatic spring 1 is provided which is not in itself subject of the invention. As previously mentioned, the piston rod 2 of this pneumatic spring extends out of the lower end of the housing 3, through sealing means. An axially displaceable release pin 4 extends from the outer end of the housing 3 through sealing means, and serves for actuating blocking means which are provided in a piston by-pass passage in the pneumatic spring, for locking the piston in a desired set position by blocking communication between a space below the piston and a space above the piston. The housing of the pneumatic spring 1 is a strong construction, in that it consists of two concentrically disposed steel tubes. The by-pass passage is constituted by the space between the two steel tubes. As a result of the double shell construction of the housing, the pneumatic spring is particularly suitable for the height adjustment of structures such as chair seats, stool seats and the like, since as a result of its stability, the housing 3 can serve directly as the chair column, in an economic manner. In the illustrated embodiment, the pneumatic spring 1 is received in a chair base 5. Such a chair base is formed by a guide tube 7 onto which radially extending support arms 8 are fixed, for example welded, at the lower region of its exterior, the guide tube extending perpendicularly to the floor 6 and axially slidably carrying the pneumatic spring 1. A running roller 9 may be provided at the free end of each support arm 8, for example a caster roller which can swing in a circular path about a vertical axis. Alternatively, devices may be provided for equalizing possible unevenesses in the floor. The lower end of the guide tube 7 is provided with a base 10 in which the free end of the piston rod 2 is axially non-displaceably but laterally fixed.

This manner of fixing the lower end of the piston rod 2 may take place in various ways. According to FIG. 1, the base 10 consists of an inwardly flanged rim 11. This engages relatively deeply in an annular groove of a yieldably resilient disc-shaped body 12 for example of rubber. The body 12 is arranged between two metal washers 13. A stud-shaped free end 14 of the piston rod 2 extends through the washers and the body 12, and is held captive in the resilient body 12, in an axially non-displaceable manner, by a spring clip is. Depending on the elasticity of the body 12, the axially substantially non-displaceable piston rod can align itself in the base of the guide tube in accordance with the possibly changing load direction of the housing3, which constitutes the chair column.

In the modification illustrated in FIG. 2, the laterally movable securing of the free stud-shaped end 14 of the piston rod is such that the pneumatic spring can at the same time rotate about its longitudinal axis in the guide tube 7 in a practically jamming-free manner. The base 10 of the guide tube 7 is formed by a welded in thick annular disc 15a the diameter of the central opening of which is considerably greater than the diameter of the studlike end 14 of the piston rod 2. A thrust-bearing 16 is arranged on the stud 14, its upper race 17 being press fitted onto the stud 14 so as to bear against the step formed between the stud 14 and the main body of the piston rod. The lower race 18 bears against the inner side of the base 10 constituted by the annular disc 15. For axially non-displaceably mounting the stud 14 in the base 10, the opening 19 of the annular disc 15 is covered from the outside of the base 10 by an annular disc 20 which is seated on the stud 14 practically without play, and is secured by means of a spring ring 21. The spring ring 21 engages in an annular groove of the stud 14 which is provided at such a spacing from the main body of the piston rod 2, which corresponds to the total of the thickness of the thrust bearing 16, the base 10 and the outer annular disc 20. Thus, the stud 14 of the piston rod is axially non-displaceably but nevertheless laterally movably anchored in the base 10 of the guide tube 7, and can readily participate in the swivelling movement of the chair seat.

The housing 3 of the pneumatic spring 1 can slide up and down axially directly in the guide tube 7, with little play. Preferably however, a bush 22 for example of plastics is provided between the guide tube of the chair base, stool base or the like and the housing of the pneumatic spring, in order to facilitate this sliding movement, the upper end of the bush being provided with a collar which closes off or masks the upper wall edge of the guide tube, if desired. The upper end of the housing is rigidly connected with the underside 24 of the seat surface member 25 of the chair, stool or the like, by means of an arrangement 23. In the illustrated embodiment, this arrangement is constituted by a hollow hub 26 of frusto-conical shape which has an annular flange 27 by which it is rigidly fixed to the underside 24 of a seat surface member 25, for example by means of screws. An actuating device for the pneumatic spring is provided in the conically extending wall of the hub 26. The actuating device comprises a two-armed actuating lever with unequal arm lengths, rockably mounted between two bearing lugs 28 which border an opening 29 leading to the interior of the hub 26. The free end of the shorter lever arm 31 co-operates with the free end of the release pin 4, whereas the other longer lever arm is formed as a handle 32. By suitably actuating the handle 32, the release pin 4 is pressed in the direction towards the housing 3, so that the by-pass passage in the interior of the pneumatic spring is opened, and the seat surface member 25 can be adjusted to a higher or lower seating position.

The end of the hollow hub 26 remote from the flange 27 is in the form of a cylindrical region 33. The internal diameter of this cylindrical region 33 corresponds substantially to the external diameter of the housing 3, there being an annular step 34 between the bore of the region 33 and the remainder of the hub 26, so that when the upper end portion of the housing 3 of the pneumatic spring is inserted into the cylindrical region 33, the end of the housing 3 can engage against the step 34. The wall of the cylindrical region 33 is provided with a slit which is bordered by two clamping lugs 35 through which a clamping screw 36 passes. The arrangement 23 thus serves for fixedly connecting the housing of the pneumatic spring, with the seat surface member 25.

FIG. 3 of the drawing is given by way of example and is a longitudinal sectional view through a lifting device of the invention, showing a piston rod thereof in its maximum extended position.

Each pneumatic or hydro-pneumatic lifting device forming the basis of the invention comprises a housing 3 which essentially consists of two concentrically disposed steel tubes 40 and 47 of different diameters. At one end the housing is gas or liquid tightly closed by a double base 46, and at the other end by a plug 66. In the inner steel tube 40, a piston 44 is axially displaceably guided, and the piston is fixed by means of a hollow stud 69 onto a piston rod 2, a plunger or the like which extends in a gas or liquid-tight manner through the plug. The double base comprises two individual base portions 52,53 which enclose between them a by-pass or deflection region 47, the greater part of the deflection region being disposed in the outer base portion 52 and only a small part of the deflection region 47 extends into the inner base portion 53. A releasing pin 4 is axially displaceably guided in a sealed manner, coaxially in the two base portions, its inner end having a head 54 serving as an abutment, the pin extending with its other end outwardly from a boss 65 of the outer base portion 52, which is preferably provided with an external thread. The outwardly extending end of the pin 4 is arranged for engagement by a lever linkage in the form of a double armed lever which serves as an actuating element for axial displacement of the release pin, the boss 52 of the outer base portion serving for abutment on a boss, a projection or the like of a table top, chair seat or other plate-like member.

Both base portions 52,53 have cylindrical pot-shaped recesses 59 or 60 in their sides which face each other, the margins 60 of the openings which face each other being widened towards the inside, in a somewhat frusto-conical manner. The cylindrically extending part has a depth which corresponds to the height extending parallel to the longitudinal axis of a sealing ring 56 with an ideal rectangular cross-section. The ring surface facing the deflection region 47 of each sealing ring is notched substantially V-shaped in cross-section so that the inner ring wall which surrounds and guides the release pin 4 in considerably smaller in height than the outer ring wall of each sealing ring. The pressure of the housing contents presses on each sealing ring in dependence on the V-shaped notching so that the considerably higher ring wall is pressed with essentially greater force into the cylindrically pot-shaped recess than is the significantly lower ring wall pressed on the shank of the release pin 4, so that with axial displacement of this release pin the two sealing rings 56 cannot be moved out of their seats. In both base portions, the sealing rings serve not only for sealing, but also additionally for guiding the release pin, the bore receiving the release pin in the outer base portion having a diameter which ensures a sliding or displacing of the release pin.

The release pin 4, which essentially forms the blocking device for the housing chamber 43 lying in front of the piston 44, has an annular groove 57 disposed between the regions engaged by the two sealing rings 56. The groove 57 has frusto-conically shaped outwardly extending side walls 58. The annular groove 57 cooperates with an axial bore 55 provided in the inner base portion 53 next to the respective seal of the release pin, and opens into the housing chamber 43. This bore 55 has a somewhat larger diameter than the shank diameter of the release pin which passes coaxially through this bore. If for the height adjustment of the lifting device, the release pin is pushed into the housing, then the housing contents, under the action of the piston movement, flow through this bore 55 into the deflection chamber 47 through the open annular groove 57 which is now adjoining.

The inner steel tube 40 carrying the piston 44 is arranged with its end facing the blocking device gas and liquid tightly disposed on a reduced diameter peripheral portion 61 of the inner base portion 53, if desired with the use of a sealing ring 62. The outer steel tube 47, which surrounds the inner steel tube leaving an annular gap-shaped surrounding chamber 52, extends over the outer periphery of the inner base portion 53 and receives a centralizing rim 63 of the abutting outer base portion 52, with which it is gas and liquid tightly connected. By the dimensional difference of the inner diameter of the outer steel tube and the outer diameter of the inner steel tube, the radial width of the by-pass chamber 42 is determined. The by-pass chamber 42 is connected by at least one axial flow opening 48 in the inner base portion 53 of the double base 46, with the part of the deflection chamber 47 which extends somewhat into this, through which any of the contents of the housing present in the deflection chamber and standing under pressure, passes into the by-pass chamber. For introducing the container contents, e.g., pneumatic or hydro-pneumatic fluid, the outer base portion 52 may, for example, be provided with a threaded closure 64.

At the other end of the housing 3, the plug 66 is stepped to the inner diameter of the inner steel tube 40 so that a centralizing region 68 results, which extends into the inner steel tube. The outer steel tube 47 is extended over the outer periphery of the plug which is common to both steel tubes, and is secured to this in a gas and liquid tight manner. The bore in the plug carrying the piston rod 2, the plunger or the like, is provided with a seal 67 in which the piston rod 2 is slidingly sealed. The bore 51 which extends towards the inside of the housing at the inner end of the plug has a larger diameter than the piston rod, plunger or the like, so that the pressure medium can flow out of the expansion chamber formed as an annular groove 50 in the plug, into the housing chamber 45 disposed behind the piston 44. The by-pass chamber 42 is extended beyond the fixing point of the inner steel tube 40 formed by the centralizing portion 68, so that the by-pass chamber 42 can be connected with the annular chamber 50 constituting the expansion chamber in tHe plug, by at least one radial bore 49.

If, for example, the lifting device, which is illustrated in the drawing in substantially its fully drawn out position, is required to be shortened, that is to say, the height of a table top, or a chair seat is required to be steplessly reduced, then by means of the lever linkage which is not illustrated, the blocking device is opened by pushing a release pin 4 into the housing. By pushing down the table top or chair seat, or the like, by hand, the piston 44 drives the housing contents disposed in front of the piston through the deflection chamber 47 and through the flow opening 48 into the by-pass chamber 42 and from there through the radial bores 49 into the annular chamber 50 of the plug 66, from where it can pass through the axial bore 51 into the housing chamber 45 behind the piston. On steplessly reaching the desired height of the table top, chair seat or the like, the blocking device is again closed; whereupon due to the loading of the housing contents, for example compressed gas, the table top or the chair seat is locked in the new position.

As a person skilled in the art can easily recognize, the lifting device according to the invention can still flex or resiliently bounce after closing of the release pin 4 whenever there is a gas filling the spaces 43 and 45 on both sides of the piston 44. The piston 44, it is true, is then set with the piston rod 2 at a certain level, but it is not firmly locked, i.e., it is not entirely unshiftable, but it can still flex or resiliently bounce against the gas pressure so that such an embodiment is particularly well suited for chairs which are to be adjustable in height, on the one hand, but still have genuine characteristics of resilience, on the other hand.

Modifications are possible. For example, the means which prevent relative rotation between the piston of the pneumatic spring and the cylinder surface thereof, on swivelling of the chair, may be provided by a swivel joint in the arrangement by which the chair is connected to the pneumatic spring, instead of in the arrangement by which the pneumatic spring is connected to the chair base.

I claim:

1. A continuously adjustable device for adjusting the height particularly of the seat of chairs, stools or the like, comprising a pneumatic spring adjustably mounted in a vertical guide tube of a pillar of the chair or the like, a tubular casing containing a fluid filling and connected to the seat at its upper end, a piston axially movable in said tubular casing mounted on a piston rod emerging at its other end through a seal in said casing, said piston rod being immovably anchored in the bottom of said guide tube, and a lifting device capable of locking the piston in an adjusted position blocking an overflow opening for the above-mentioned filling and having a release pin emerging from the end of the casing connected to the seat, said pin being capable of opening said overflow opening and of connecting the casing space ahead of said piston to the casing space behind said piston via a by-pass chamber, the free end of the solid piston rod (2) being anchored in the bottom of the guide tube for allowing lateral movement but restraining it axially.

2. A device according to claim 1, wherein the free end of the piston rod is formed as a stud carrying a thrust bearing supported by the upper side of a bottom closure member of guide tube, the stud extending through an opening in the said bottom, with radial play and being secured against withdrawal and substantially without axial play, by securing means disposed below the said bottom, for example by means of an annular disc and a spring clip.

3. A device according to claim 1, wherein the said fixing means comprise a hub member of substantially truncated conical shape, having an annular flange enabling its securement to the underside of the seat surface member, the free end of the hub member being constructed as a clamping device for clamping the said one end of the housing.

4. A device according to claim 1, wherein a double-armed actuating lever is rockably mounted in the conical wall of the hub member, one arm of the lever cooperating with the free end of the release pin, and the other arm being constructed as an actuating handle.

5. A device according to claim 1 characterized in that for achieving axial restraint and radial mobility the free end of the piston rod (2) is constructed as a pin (14) receiving a thrust ball bearing (16) and passes through the bottom (10 or 15a, respectively) of said guide tube (7) supporting at its inside said thrust ball bearing with radial play, and is secured on the outside of said bottom by means of a ring washer (20) and a circular clip (21) against being pulled out axially, practically without play.

6. A device according to claim 1 characterized in that for attaining axial restraint and radial mobility a disc-shaped body (12) of elastically resilient material is anchored on the free end (14), constructed as a pin or piston rod (2), which body has on its periphery an annular groove engaging with a beaded margin (11) forming the bottom of the guide tube (7).

* * * * *